Dec. 18, 1945.   P. J. MINICHELLO   2,391,029
MINERAL SEPARATING AND SIZING DEVICE
Filed April 6, 1942   2 Sheets-Sheet 1
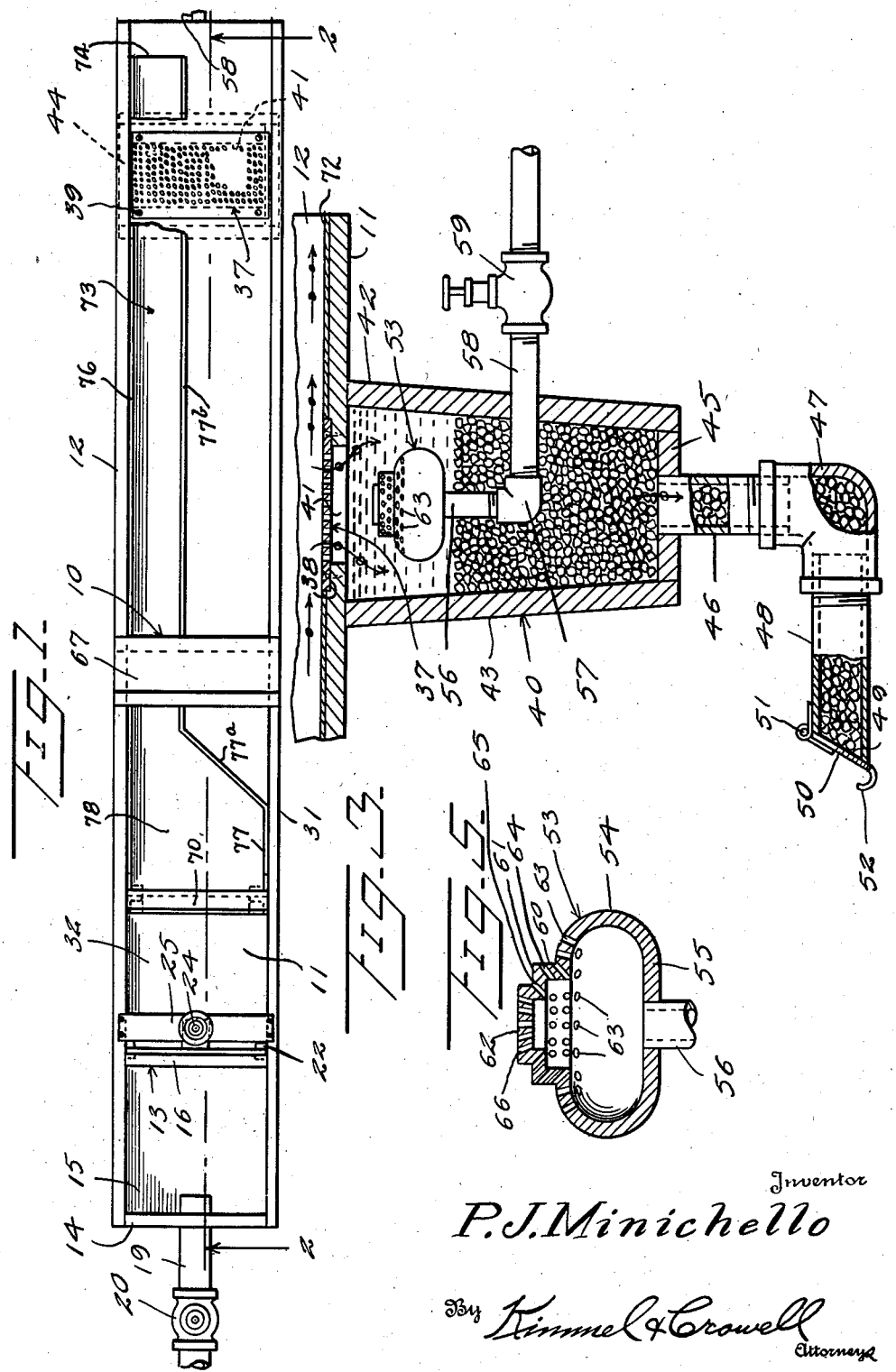
Inventor
P.J.Minichello
By Kimmel & Crowell
Attorneys Dec. 18, 1945.    P. J. MINICHELLO    2,391,029
MINERAL SEPARATING AND SIZING DEVICE
Filed April 6, 1942    2 Sheets-Sheet 2
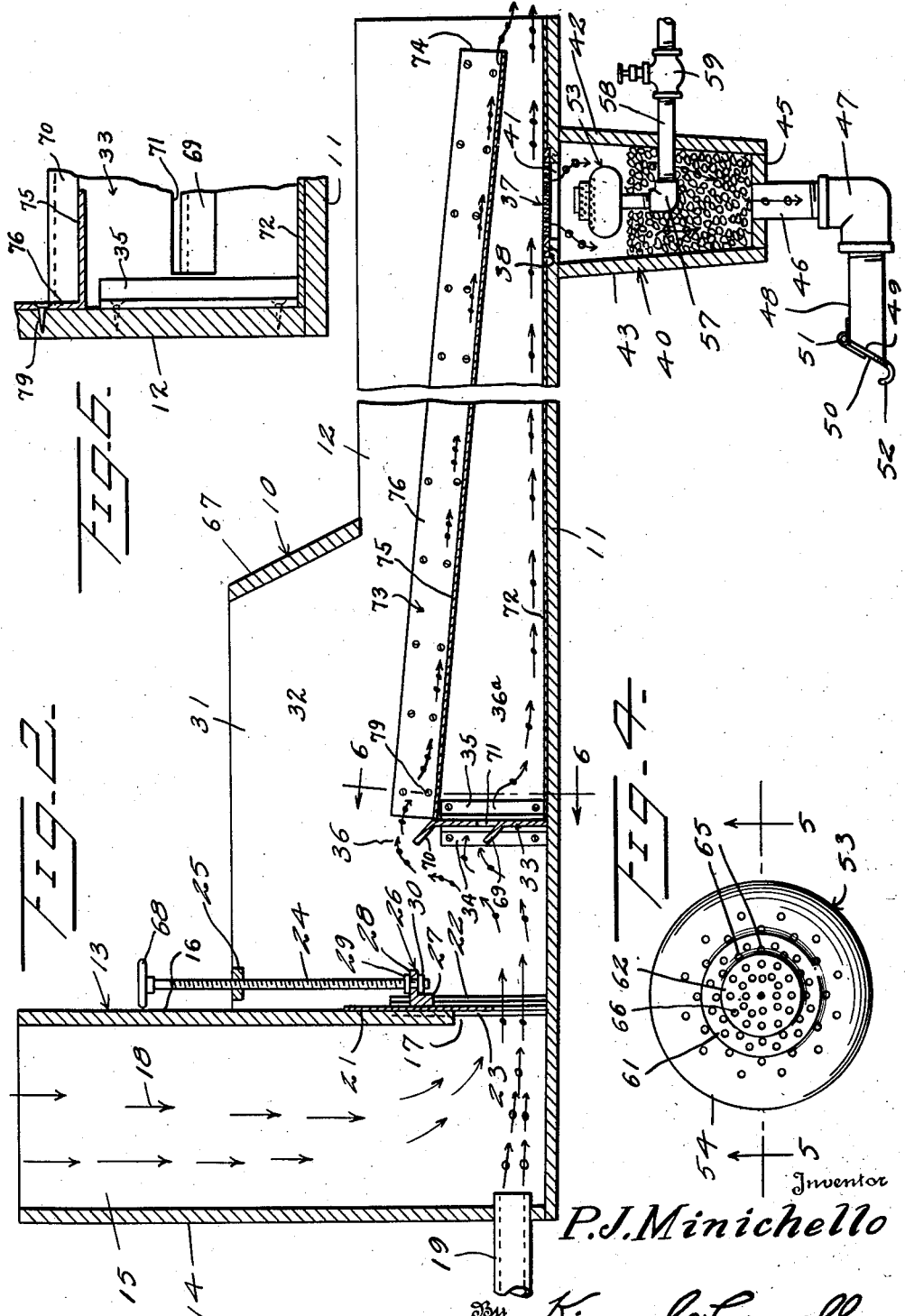

Patented Dec. 18, 1945

2,391,029

UNITED STATES PATENT OFFICE 2,391,029

MINERAL SEPARATING AND SIZING DEVICE

Peter J. Minichello, Pittston, Pa., assignor of one-half to Michael Valenzano, Dunmore, Pa.

Application April 6, 1942, Serial No. 437,888

7 Claims. (Cl. 209—454)

This invention relates to mineral separating and sizing devices.

An object of this invention is to provide a separating device for separating a mineral such as coal or the like from heavier mineral such as rock, silt or the like.

Another object of this invention is to provide a trough through which the material is adapted to be moved by a fluid medium, the trough being provided with an upstanding baffle over which the mixture of the fluid and the material is adapted to pass, and also a screen in the trough bottom through which the heavy material is adapted to drop, the coal passing on through the trough to the discharge end thereof.

A further object of this invention is to provide in a separator of this kind a fluid agitator for agitating the material passing over and dropping through the screen.

To the foregoing objects and to others which may hereinafter appear, the invention consists of the novel combination, construction and arrangement of parts as will be hereinafter referred to and illustrated in the accompanying drawings wherein is shown an embodiment of the invention, but it is to be understood that changes, variations and modifications may be resorted to which fall within the scope of the invention as claimed.

In the drawings:

Figure 1 is a detail top plan of a mineral separator constructed according to an embodiment of this invention, Figure 2 is a longitudinal section partly broken away taken on the line 2—2 of Figure 1, Figure 3 is an enlarged fragmentary vertical section of the screen and agitating structure, Figure 4 is a top plan of the agitator or spray nozzle structure, Figure 5 is a sectional view taken on the line 5—5 of Figure 4, and Figure 6 is a fragmentary sectional view taken on the line 6—6 of Figure 2.

Referring to the drawings, the numeral 10 designates generally an elongated trough which is open on its upper side and is formed of a bottom wall 11 and upstanding side walls 12. The trough 10 at its forward or discharge end is open and at the rear or intake end of the trough 10 there is mounted a vertically disposed material duct, generally designated as 13. The duct 13 includes an upstanding rear wall 14, opposite side walls 15 and a forward wall 16. The forward wall 16 extends transversely across the rear end of the trough 10 and terminates at its lower end in spaced relation to the upper side of the bottom wall 11 thereby providing opening 17 through which the material is adapted to pass for entrance into the receiving end of the trough 10. The material in the form of coal or the like is discharged into the receiving chute or duct 13, passing downwardly as shown by the arrows 18, and when the material reaches the bottom of the duct 13, this material is forced forwardly into the trough 10 by means of a water discharge nozzle 19. The nozzle 19 extends through the rear wall 14 and may be provided with a regulating valve 20.

The quantity of coal or other mineral including the water passing through the opening 17 into the receiving end of the trough 10 is regulated by means of a vertically shiftable gate valve 21. The valve 21 is constructed in the form of a plate and is vertically slidable in pairs of opposed angle-shaped guide members 22 and 23 which are fixed to the inner sides of the side walls 12. The valve 21 is regulated or adjusted by means of a threaded shaft 24 which is threaded through a transversely extending bar 25. The lower end of the shaft 24 is rotatably mounted in an L-shaped bracket 26 which has one side 27 thereof fixed to the adjacent side of the valve 21 and the other side 28 of the bracket 26 extends horizontally and forwardly from the valve 21.

The lower end of the shaft 24 is swively or rotatably mounted in the horizontal leg 28 and is held against endwise movement by means of upper and lower collars 29 and 30 which are fixed to the shaft 24 on opposite sides of the leg 28. The opposite side walls 12 of the trough 10 are provided with upwardly extending side portions 31 which extend above the upper edges of the side walls 12 thereby forming an enlarged receiving chamber forwardly of the intake opening 17. In order to provide a means whereby the water will thoroughly mix with the mineral in the receiving chamber 32, I have provided an upstanding baffle 33 which is secured transversely across the receiving chamber 32 forwardly of the opening 17. The baffle 33 is disposed between vertical guide members 34 and 35 which are fixed to the side walls 12 of the trough 10 within the receiving chamber 32.

The baffle 33 is formed with a pair of upwardly and rearwardly inclined baffles 69 and 70 and also with an opening 71 so that the mixture may flow over the baffle 69 and along the lower portion of the trough 10, the bottom wall 11 of which has a metal lining 72. An inner trough 73 is disposed within the trough 10, extending forwardly and downwardly from the baffle 70 toward the discharge end of the trough 10 and terminates at its forward end 74 inwardly of the forward end of the trough 10 so that the light material passing over the baffle 70 and along the upper trough 73 will mix with the screened material beyond the screen 37.

The trough 73 comprises a bottom wall 75, and side walls 76 and 77. The trough 73 at the intake end thereof, as shown in Figure 1 is equal in width to the trough 10, as indicated at 78, but the side wall 77 inclines as at 77a toward the side wall 76 and then merges in a straight wall 77b which is parallel with the side wall 76, thus providing a narrow upper trough for a major portion of the length thereof. The trough 73 is secured to the trough 10 by means of fastening devices 79. The material passing along the trough 10 below the trough 73 as indicated by the arrows 36a will pass over the screen 37 where the heavier ingredients will drop through the screen 37 into the hopper 40.

The water and light mineral are adapted to flow over the top of the baffle 33, as indicated by the arrows 36, and then to move downwardly into the trough 73 and flow forwardly towards the discharge end of the trough. Preferably, the bottom wall 11 is inclined to the horizontal so that the water and mineral will readily flow forwardly to the discharge end of the trough.

The trough 10 at a point closely adjacent the discharge end thereof is provided with a mineral separating screen or perforated plate 37. The screen 37 is mounted in a recess 38 formed in the bottom wall 11 and secured therein by means of fastening devices 39. A collector or hopper 40 is disposed in depending relation to the bottom wall 11 below the screen 37 and the bottom wall 11 is formed with an opening 41 so that the heavy material passing through the screen 37 may drop into the hopper or collector 40. The hopper or collector 40 is formed with front and rear walls 42 and 43, respectively, opposite side walls 44 and a bottom wall 45. The front and rear walls 42 and 43 are disposed in downwardly convergent relation and a pipe 46 is secured in the bottom wall 45 so that the material engaging in the hopper or collector 40 may be drawn off from the hopper or collector. An L 47 is secured to the lower end of the pipe 46 and has secured to one side thereof a pipe 48 which is formed at its rear end with an inclined face 49 against which a closure 50 mounted on a pivot 51 is adapted to gravitatingly engage. The closure 50 is formed with a hook or handle 52 so that a weight may be hung on the hook 52 to retard the discharge of the material. The closure 50 may be of sufficient weight or may otherwise be held by additional weights in a closed position so that it will not move to an open position until a predetermined pressure of the material has been formed in the collector 40, or in the waste pipe 48, whereupon the closure 50 will automatically move to an open position and will gravitatingly close when a predetermined quantity of waste has been discharged.

In order to provide a means whereby the material in the trough 10, above the screen 37, and the material in the upper portion of the hopper or collector 40 may be agitated in order to more thoroughly separate the lighter mineral or material, I have provided an agitator generally designated as 53. The agitator 53 is constructed in the form of a substantially globular hollow body 54 which has secured to the bottom wall 55 thereof a pipe 56. The pipe 56 has secured to the lower end thereof an L 57, and a pipe 58 which is connected to a source of water or other liquid supply is connected to the lower or horizontal side of the L 57.

A regulating valve 59 is adapted to be interposed in the pipe 58. The nozzle body 53 includes an upstanding cylindrical wall 60 having formed integral therewith a horizontal or annular wall 61 and a top wall 62 is secured to and disposed in upwardly offset relation with respect to the horizontal wall 61. The body 54 is formed with a plurality of upwardly and outwardly directed jet openings 63 and the walls 60 and 61 also have upwardly and outwardly directed openings 64 and 65 through which water is adapted to be ejected. The top wall 62 is also provided with a plurality of jet openings 66 which may be disposed in upwardly divergent relation so that the water discharged from the agitator member 53 will contact substantially the entire lower side of the screen 37 and will be forced through the perforations of the screen 37.

The openings 63 and 64 in the agitator member 53 also provide a means whereby the agitating jets of water will extend over the entire screen 37 so that the water and material above the screen 37 will be agitated to a degree sufficient to separate the lighter material from the heavier material, the latter dropping through the screen 37 into the collector 40.

In the use and operation of this separator, the material is initially discharged into the receiving duct 13 and will gravitatingly move downwardly in this duct towards the lower end thereof, the water being forced out of the nozzle 19 will force the material in the lower open portion of the duct 13 through an opening 17, and the combined water and material will then impinge against the baffle 33 and will flow over this baffle and then downwardly along the trough 10.

In order to provide a means whereby the combined water and material may not be sprayed or splashed out of the mixing chamber 32, I have provided transversely disposed and inclined baffle 67 which is secured between the side wall extensions 31 at the forward ends thereof. The material flowing along the trough 10 and over the screen 37 will be agitated by the water rising from the spray member 53 and the heavier material will drop through the screen 37, whereas the lighter material will flow over the screen 37 to the discharge end of the trough. While this separator has been designed for separating coal or the like, it may be used for separating any other desired mineral from undesired material, and by means of the screen 37 the separator also constitutes a sizing means for sizing the material as the smaller material may drop down through the screen 37 into the collector 40. The amount of material passing through the opening 17 may be regulated by vertical adjustment of the gate 21 which is effected by a hand wheel or operator 68 carried by the upper end of the threaded shaft 24.

What I claim is:

1. A mineral separator comprising in combination a trough, a receiving hopper at one end of said trough, a liquid discharge nozzle at the lower end of said hopper for forcing the material lengthwise of said trough, a vertically adjustable gate valve slidable between the rear end of said trough and said hopper, an upstanding baffle in said trough forwardly of said valve, a screen in the bottom of said trough forwardly of said baffle, a collector below said screen, and means in said collector spaced downwardly from said screen for agitating the material passing through and over said screen said means comprising a nozzle head having a plurality of fluid jet openings.

2. A mineral separator comprising in combination a trough, a receiving hopper at one end of said trough, a liquid discharge nozzle at the lower end of said hopper for forcing the material lengthwise of said trough, a vertically adjustable gate valve slidable between the rear end of said trough and said hopper, an upstanding baffle in said trough forwardly of said valve, a screen in the bottom of said trough forwardly of said baffle, a collector below said screen, and a spray nozzle in said collector spaced downwardly from said screen for agitating the material passing through and over said screen said nozzle being formed with a plurality of jet openings.

3. A mineral separator comprising in combination a trough, a receiving hopper at one end of said trough, a liquid discharge nozzle at the lower end of said hopper for forcing the material lengthwise of said trough, a mixing chamber communicating with said trough and disposed adjacent said hopper, a vertically adjustable gate valve disposed between said hopper and said chamber, an upstanding baffle in said chamber forwardly of said valve, a screen carried by the trough in the bottom thereof forwardly of said baffle, a collector depending below said screen, and means in said collector spaced downwardly from said screen for agitating the material passing through and over said screen said means comprising a nozzle head having a plurality of fluid jet openings.

4. A mineral separator comprising in combination a trough, a receiving hopper at one end of said trough, a liquid discharge nozzle at the lower end of said hopper for forcing the material lengthwise of said trough, a mixing chamber communicating with said trough and disposed adjacent said hopper, a vertically adjustable gate valve disposed between said hopper and said chamber, guide means for said valve, means for vertically adjusting said valve, an upstanding baffle in said chamber forwardly of said valve, a screen carried by the trough in the bottom thereof forwardly of said baffle, a collector depending below said screen, and means in said collector spaced downwardly from said screen for agitating the material passing through and over said screen said means comprising a nozzle head having a plurality of fluid jet openings.

5. A mineral separator comprising in combination a trough, a receiving hopper at one end of said trough, a liquid discharge nozzle at the lower end of said hopper for forcing the material lengthwise of said trough, a mixing chamber communicating with said trough and disposed adjacent said hopper, a vertically adjustable gate valve disposed between said hopper and said chamber, an upstanding baffle in said chamber forwardly of said valve, an inclined guard plate at the forward end of said chamber above the trough bottom, a screen carried by the trough in the bottom thereof forwardly of said baffle, a collector depending below said screen, and means in said collector spaced downwardly from said screen for agitating the material passing through and over said screen said means comprising a nozzle head having a plurality of fluid jet openings.

6. A mineral separator comprising a trough, a receiving hopper at one end of said trough, a liquid discharge nozzle at the lower end of said hopper for forcing the material lengthwise of said trough, an upstanding baffle plate in said trough forwardly of said hopper, said baffle plate having an intermediate opening therethrough and including a lower upwardly and rearwardly extending baffle member extending from said opening, and an upper upwardly and rearwardly inclined baffle member, an inner trough disposed within said first trough and extending from said upper baffle member, a screen in said first trough below said upper trough, a collector depending below said screen, and means agitating the material passing over said screen.

7. A mineral separator comprising a trough, a receiving hopper at one end of said trough, a liquid discharge nozzle at the lower end of said hopper for forcing the material lengthwise of said trough, an upstanding baffle plate in said trough forwardly of said hopper, said baffle plate having an intermediate opening therethrough and including a lower upwardly and rearwardly extending baffle member extending from said opening, and an upper upwardly and rearwardly inclined baffle member, an inner trough disposed within said first trough and extending from said upper baffle member, a screen in said first trough below said upper trough, a collector depending below said screen, and means agitating the material passing over said screen, said latter means being disposed wholly within said collector.

PETER J. MINICHELLO.